Jan. 23, 1951 J. N. WEILAND 2,538,996
FLUID ACTUATED CLUTCH AND BRAKE MECHANISM
Filed Oct. 6, 1947 3 Sheets-Sheet 2

INVENTOR.
JOHN N. WEILAND
BY
Gustav A. Wolff
ATT.

Jan. 23, 1951     J. N. WEILAND     2,538,996
FLUID ACTUATED CLUTCH AND BRAKE MECHANISM
Filed Oct. 6, 1947     3 Sheets-Sheet 3

INVENTOR.
JOHN N. WEILAND
BY
Gustav A. Wolff
ATT.

Patented Jan. 23, 1951

2,538,996

UNITED STATES PATENT OFFICE 2,538,996

FLUID ACTUATED CLUTCH AND BRAKE MECHANISM

John N. Weiland, Cleveland, Ohio, assignor to The Cleveland Punch & Shear Works Co., Cleveland, Ohio, a corporation of Ohio Application October 6, 1947, Serial No. 778,224

6 Claims. (Cl. 192—17)

This invention relates to clutch devices with double acting clutch members adapted to selectively couple a single rotary element with several other elements. Clutch devices of this type, to which also pertain the devices disclosed in Patent No. 2,458,664, dated January 11, 1949, and in copending applications Serial Nos. 772,117, filed Sept. 4, 1947, now Patent Number 2,529,121, dated November 7, 1950, and 768,386, filed August 13, 1947, now Patent Number 2,527,865, dated October 31, 1950, are particularly well suited for power presses and other machines with continuously driven fly-wheels to selectively transfer the rotary motion and energy of the fly-wheels to the parts to be driven and arrest the motion of the thus driven parts.

The primary object of the present invention is the provision of a clutch device having a double acting, shiftable frictional clutching member to effect selective coupling of a rotary element with two other elements axially aligned therewith, the double-acting clutching member including radially and laterally spaced, parallel friction flanges to effect selective frictional engagement with either one of the two other elements when the clutching member is shifted with respect to the axis of the clutch device.

Another object of the invention is the provision of a clutch device having a double-acting, shiftable frictional clutching member to effect selective coupling of a rotary element with two other elements axially aligned therewith, the double-acting clutching member embodying radially and laterally spaced, parallel, friction-lining supporting flanges, lined with friction lining to provide a clutching member including a convexly shaped friction surface and a concavely shaped friction surface for selective frictional engagement of the clutching member with either one of the two other elements when such member is shifted with respect to the axis of the clutch device.

A further object of the invention is the provision of a clutch device having a double-acting, shiftable, frictional clutching member to effect selective coupling of a rotary element with two other elements axially aligned therewith, the double-acting clutching member being of Z-shaped cross section and embodying laterally spaced, parallel, curved, friction-lining supporting flanges lined with friction lining to provide a clutching member having a convexly shaped and a concavely shaped friction surface and permitting selective frictional engagement of a rotary element with either one of the two other elements aligned with the clutch device and the rotary element by shifting of the clutching member with respect to the axis of the clutch device.

Still another object of the invention is the provision of a clutch device having a double-acting, shiftable, frictional clutching member to effect selective coupling of a rotary element with two other elements axially aligned therewith, the double-acting clutching member having Z-shaped cross section and being assembled from lined, curved sections of angular cross section adjustably secured to each other to form a clutching member with laterally spaced, adjustable, curved friction-lining supporting flanges and providing the clutching member with a convexly shaped and a concavely shaped friction surface for selective frictional engagement of the member with either one of two other elements by shifting of the clutching member with respect to the axis of the clutch device.

A still further object of the invention is the provision of a clutch device having a double-acting, shiftable, frictional clutching member to effect selective coupling of a rotary element with two other elements axially aligned therewith, the double-acting clutching member having Z-shaped cross section and being assembled from lined, curved sections of angular cross section adjustably secured to each other by eccentric adjusting devices to provide a clutching member including laterally spaced, adjustably mounted curved, friction-lining supporting flanges forming convexly and concavely shaped friction surfaces for selectively coupling the clutching member with either one of two elements by shifting such member with respect to the axis of the clutch device.

With the above and other incidental objects in view which will appear hereinafter, the invention consists in certain other novel features of construction and combination of parts, the essential elements of which are set forth in the appended claims; and a preferred form of embodiment of the invention is hereinafter shown with reference to the drawings accompanying and forming part of the specification.

Figure 1:
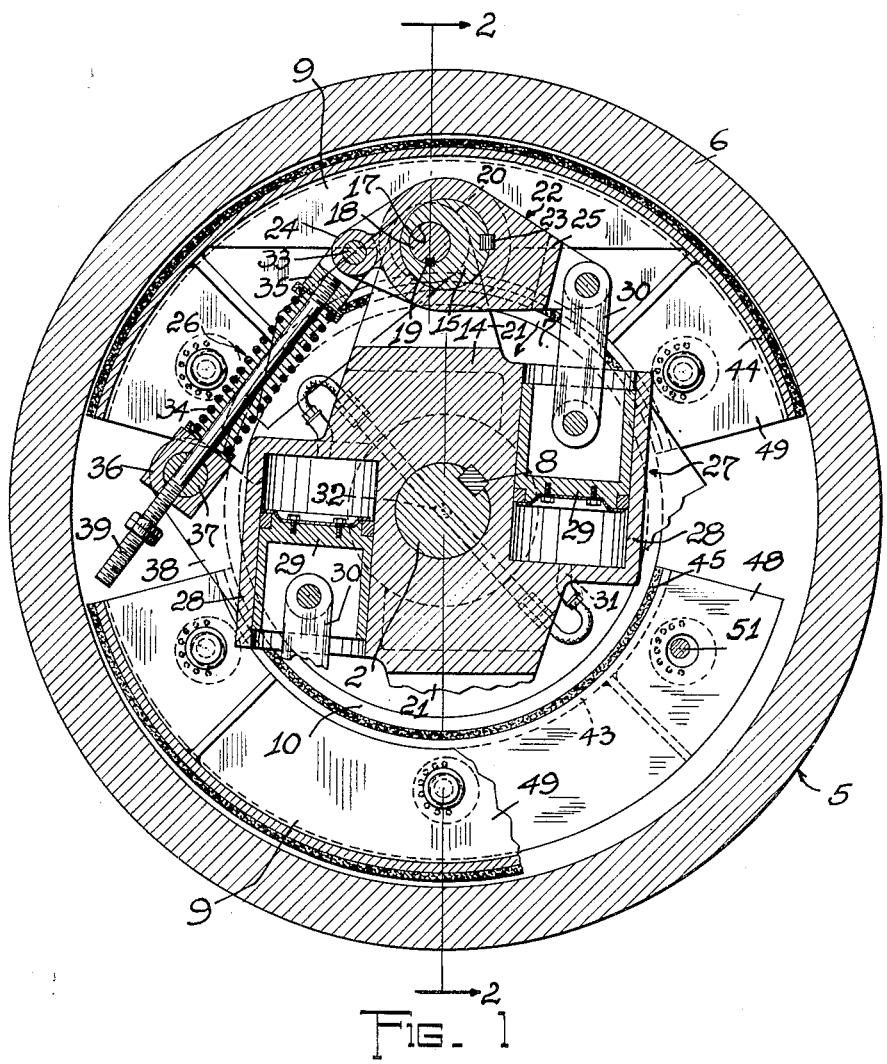
Fig. 1 is a transversal sectional view through a fluid operated clutch and brake mechanism with a double-acting clutching member constructed in accordance with the invention, the mechanism being shown attached to and coupled with the driven shaft and fly-wheel of a power driven machine, a power press, and the section being taken on line 1—1 of Fig. 2 of the drawings.
Figure 2:
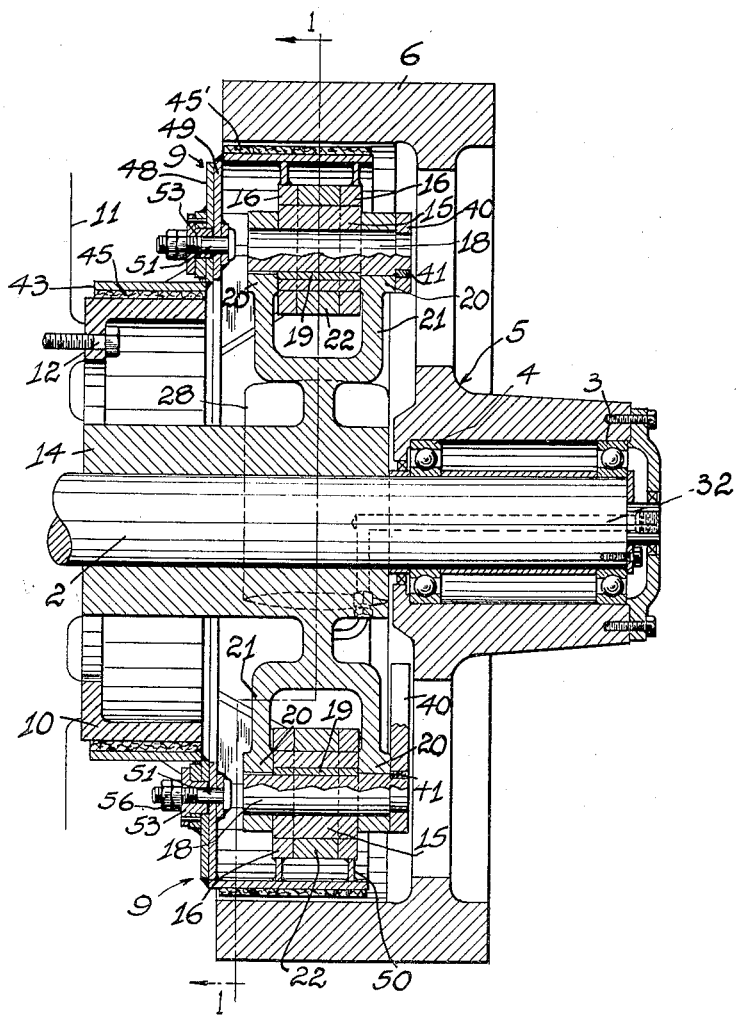
Fig. 2 is a longitudinal cross sectional view, through the fluid operated clutch and brake mechanism shown in Fig. 1, the section being taken on line 2—2 of Fig. 1.
Figure 3:
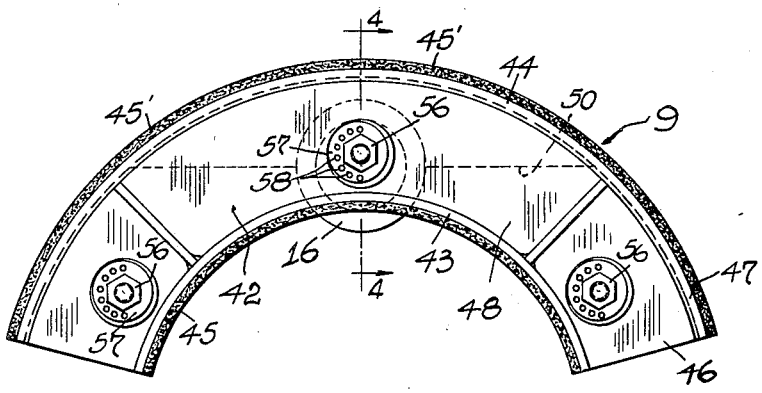
Fig. 3 is a front view of one of the double-acting clutching members of the clutch and brake mechanism shown in Figs. 1 and 2.
Figure 5:
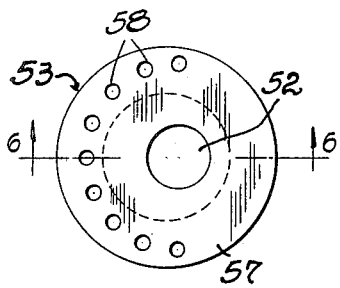
Fig. 5 is a front view of an eccentric adjusting member for adjusting the distance between the friction surfaces of the clutching member.
Figure 4:
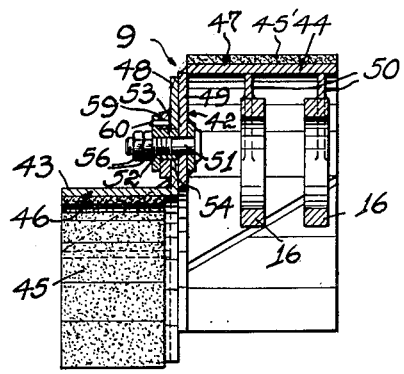
Fig. 4 is a cross sectional view through the double-acting clutching member shown in Fig. 3, the section being taken on line 4—4 of Fig. 3.
Figure 6:
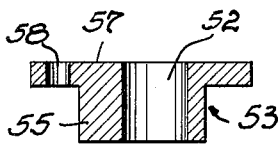
Fig. 6 is a sectional view on line 6—6 of Fig. 5.

Referring now in detail to the drawings showing a clutch device with a double-acting clutching member, shown applied to a power driven machine, reference numeral 2 denotes the crank shaft of a power press (not shown), which shaft freely rotatably mounts in roller bearings 3 and 4 a fly-wheel 5 driven in any suitable manner. This fly-wheel has the inner cylindrical surface of its rim portion 6 smoothly finished to provide a friction clutch drum member for a clutch and brake mechanism 7 mounted on shaft 2 and secured thereto by a key member 8. This clutch and brake mechanism includes oppositely arranged shiftable clutching members 9 constructed and actuated for selective clutching operation with rim portion 6 and a brake drum 10 secured to frame 11 of the power driven machine by bolts 12.

The clutching members 9, embodying clutch and brake shoe members, as will be later described, are shiftably coupled with base 14 of clutch and brake mechanism 7 by a short shaft or eccentric 15 which is freely rotatably extended into bearings 16 of the clutching members. This shaft mounts in an eccentric bore 17 a pin 18 which is extended through said bore, keyed to eccentric 15 by a key 19 and pivotally supported in perforated ear portions 20 of a fork-shaped extension 21 on base 14. Shifting of the clutching members is effected when eccentric 15 is rotated on pin 18, and such a rotation of the eccentric is controlled by an actuating lever 22 which is sleeved upon the eccentric and secured thereto by a key 23. This actuating lever embodies two lever arms 24 and 25, lever arm 24, the shorter one, being pivoted to a pretensioned spring arrangement 26 later to be described, and lever arm 25, the longer one, being linked to a fluid operated shifting device 27. This device embodies a cylinder 28 with a piston 29 which is linked to lever arm 25 by a link member 30. The fluid operated shifting device 27 is positively actuated in one direction by fluid entering cylinder 28 through a passage 31 in the bottom wall of the cylinder and this passage openly communicates with a bore 32 in shaft 2 to permit feeding of fluid into the cylinder 28 and shifting of piston 29 by such fluid, all for the purpose of effecting outward movement of clutching members 9 into clutching engagement with the rim 6 of fly-wheel 5.

Shifting device 27 is shifted in an opposite direction by the pretensioned spring arrangement 26 which is pivoted to the lever arm 24 of lever 22 by a pin 33. Pretensioned spring arrangement 26, as shown, embodies a compression spring 34 abutting a clevis 35 pivoted to lever arm 24 by pin 33 and a block member 36 pivoted by a pin 37 to a fork-shaped extension 38 on base 14. Spring 34 has axially extended therethrough a guide rod 39 threaded into clevis 35 and slidably extended through a bore in pin 37.

Centrifugal forces tending to shift clutching members 9 radially outwardly when the clutch and brake mechanism is rotating, are counteracted by counterweights 40 keyed to pins 18 by key members 41. These counterweights are arranged and proportioned to substantially equalize the centrifugal forces acting on the clutching members 9 when rotating with crank shaft 2 and insure radial inward shifting of the clutching members by the full force stored in the compression spring 34 of pretensioned spring arrangement 26.

The clutching members 9 are identical in construction and each embody an arcuate base or web portion 42 and arcuate flanges 43 and 44 extended laterally and in opposite directions from the base portion 42. Flanges 43 and 44 are lined with brake linings 45, 45' to provide flange 43 with a concavely shaped friction surface and flange 44 with a convexly shaped friction surface. The clutching members are assembled from curved sections 46 and 47 of angular cross section, which are arranged to engage each other with their vertical flanges 48 and 49 and are shiftably secured to each other and thus form, jointly, web portion 42 and, individually, arcuate flanges 43 and 44. Curved section 47 mounts the bearings 16 which by ribs 50 are welded to the concave side of lateral flange 43. Vertical flanges 48 and 49 are secured to each other by machine bolts 51 which are extended through an eccentric bore 52 in a sleeve member 53 rotatably mounted in a bore 54 in section 47. Rotation of sleeve members 53 on bolts 51 effects shifting of vertical flanges 48 and 49 with respect to each other, an action caused by the eccentric relation of body 55 of each sleeve member 53 with respect to its bore 52. A shifting of vertical flanges 48 and 49 with respect to each other automatically changes the relative position of the arcuate flanges 43 and 44 with respect to each other and thus permits simple adjustment of the clutch device in case of wear when nut members 56 on bolts 51 have been loosened up to permit rotation of the sleeve members. Enlarged head portions 57 on sleeve members 53 facilitate their rotation, and these head portions include perforations 58 arranged in equally spaced distance from the center of bore 52 to align with a bore 59 in vertical flange 48 and permit locking of sleeve members 53 in their adjusted positions by a pin 60.

In operation, when the clutch device is used as described on a power press having a crank shaft 2, this crank shaft is coupled with the continuously driven fly-wheel 5 when fluid is fed into cylinders 28 and effects shifting of pistons 29 and therewith rotation of actuating levers 22 in an anti-clockwise direction against the force of pretensioned spring arrangements 26. This rotation of levers 22 shifts clutching members 9 outwardly and effects frictional engagement of the friction surfaces of their lined arcuate flanges 43 with the inner cylindrical surface of rim 6 of fly-wheel 5, so that fly-wheel 5 transfers its rotary movement through clutching members 9, pins 18 and base 14 to crank shaft 2. In this clutching position the friction surfaces of the lined flanges 44 of clutching members 9 are disengaged from brake drum 10 and pretensioned spring arrangements 26 have their pretensioned compression springs 34 additionally tensioned. Disengagement of the clutching action of arcuate flanges 43 is effected by release of the fluid from cylinders 28 in any customary manner to permit rotation of levers 22 by springs 34 in a clockwise direction and effect shifting of clutching members 9 inwardly and frictional engagement of the friction surfaces of arcuate flanges 44 with brake drum 10 to stop rotation of base 14 and the crank shaft connected therewith.

The described construction of clutching members 9 permits quick and proper setting of the arcuate friction flanges of these members for highest efficiency and low fluid consumption in the operation of the device. Such a setting of members 9 can readily be effected after loosening up of bolts 51 which unite the vertical flanges 48 and 49 of the curved sections 46 and 47 of members 9.

Having thus described my invention, what I claim is:

1. In clutch and brake mechanism a clutching member of substantially Z-shaped cross section embodying a curved web portion, two arcuate flanges laterally extended from opposite sides and opposite edges of said web portion, and brake lining attached to said flanges to fashion said clutching member with a convexly shaped friction surface and a concavely shaped friction surface.

2. In clutch and brake mechanism a clutching member embodying substantially complementary, curved shoe members of angular cross section placed side by side so that complementary flanges thereof contact each other, and fastening means securing the said complementary flanges of said sections to each other to form a clutching member having Z-shaped cross section.

3. In clutch and brake mechanism a clutching member embodying substantially complementary, curved shoe members of angular cross section placed side by side so that complementary flanges thereof contact each other, bearing means supported by one of said shoe members, and fastening means securing the said complementary flanges of said sections to each other to form a clutching member having Z-shaped cross section.

4. In clutch and brake mechanism a clutching member embodying substantially complementary, curved shoe members of angular cross section placed side by side so that complementary flanges thereof contact each other, and rotatable means shiftably coupling the said complementary flanges of said sections with each other to form a clutching member having Z-shaped cross section.

5. In clutch and brake mechanism a clutching member embodying substantially complementary, curved shoe members of angular cross section, devices securing complementary flanges of said sections to each other to form a clutching member having Z-shaped cross section, and rotatable means with an eccentric bore sleeved upon said devices, said rotatable means being extended into a circular bore of one of said members to effect shifting of said sections with respect to each other by rotation of said eccentric means.

6. In a clutch and brake mechanism a clutching member embodying substantially complementary, curved shoe members of angular cross section, a device securing complementary flanges of said sections to each other to form a clutching member having Z-shaped cross section, rotatable means with an eccentric bore sleeved with said bore upon said device and extended into a circular bore of one of said sections to effect shifting of said sections by rotation of said rotatable means, and cooperating locking means on said one member and said rotatable means to effect locking of said sections in their adjusted positions.

JOHN N. WEILAND.

REFERENCES CITED

The following references are of record in the file of this patent:

UNITED STATES PATENTS

| Number | Name | Date |
|---|---|---|
| 524,585 | Ewart | Aug. 14, 1894 |
| 668,675 | Carlson | Feb. 26, 1901 |
| 1,643,473 | Ross | Sept. 27, 1927 |
| 2,458,664 | Weiland | Jan. 11, 1949 |

FOREIGN PATENTS

| Number | Country | Date |
|---|---|---|
| 28,246 | Germany | Jan. 13, 1884 |